United States Patent
Fuisz (10) Patent No.: US 7,899,705 B2
(45) Date of Patent: Mar. 1, 2011

(54) METHOD, APPARATUS AND SYSTEM FOR PROVIDING ACCESS TO PRODUCT DATA

(76) Inventor: Richard C. Fuisz, McLean, VA (US)

( * ) Notice: Subject to any disclaimer, the term of this patent is extended or adjusted under 35 U.S.C. 154(b) by 1556 days.

(21) Appl. No.: 10/885,067

(22) Filed: Jul. 7, 2004

(65) Prior Publication Data

US 2004/0250297 A1 Dec. 9, 2004

Related U.S. Application Data (62) Division of application No. 09/961,392, filed on Sep. 25, 2001, now abandoned.

(51) Int. Cl.
*G06Q 30/00* (2006.01)
*G06T 1/00* (2006.01)
*H04N 7/08* (2006.01)

(52) U.S. Cl. ............... 705/14.55; 715/202; 725/135

(58) Field of Classification Search ............... 705/14, 705/14.49, 55, 14.73; 715/201, 202; 725/135
See application file for complete search history.

(56) References Cited

U.S. PATENT DOCUMENTS

| | | | |
|---|---|---|---|
| 5,343,239 A * | 8/1994 | Lappington et al. ......... | 725/136 |
| 5,706,049 A | 1/1998 | Moghadam et al. | |
| 5,708,845 A | 1/1998 | Wistendahl et al. | |
| 5,918,012 A | 6/1999 | Astiz et al. | |
| 6,006,265 A | 12/1999 | Rangan et al. | |
| 6,411,725 B1 * | 6/2002 | Rhoads ........................ | 382/100 |
| 6,496,981 B1 * | 12/2002 | Wistendahl et al. ......... | 725/112 |
| 6,570,586 B1 * | 5/2003 | Kamen et al. ................ | 715/719 |
| 7,000,242 B1 * | 2/2006 | Haber .......................... | 725/43 |
| 7,356,830 B1 * | 4/2008 | Dimitrova .................... | 725/51 |
| 2004/0109087 A1 * | 6/2004 | Robinson et al. ............ | 348/461 |
| 2004/0250297 A1 * | 12/2004 | Fuisz .......................... | 725/135 |

FOREIGN PATENT DOCUMENTS

| | | |
|---|---|---|
| JP | 9-274554 | 10/1997 |
| WO | WO 97/37497 | 10/1997 |
| WO | WO 98/30025 A2 | 7/1998 |
| WO | WO 99/10822 A1 | 3/1999 |
| WO | WO 99/40506 A1 | 8/1999 |
| WO | WO 99/63514 A | 12/1999 |
| WO | WO 00/42768 | 7/2000 |
| WO | WO 00/43899 A1 | 7/2000 |

OTHER PUBLICATIONS

"Understanding ATM", downloaded Nov. 23, 2009 from http://www.hn-networks.co.uk/atm.html.*
Sammon, Rick, "Digital Imaging Takes Off", St. Louis Post Dispatch, Sunday, Jan. 17, 1999, Travel & Leisure section, p. T9.*

* cited by examiner

*Primary Examiner* — Donald L Champagne
(74) *Attorney, Agent, or Firm* — Antonelli, Terry, Stout & Kraus, LLP.

(57) ABSTRACT

VISUAL IMAGE MARKETING (VIM) is a system whereby the visual image on a film or television program is utilized to market that specific product. In VIM, film\television is combined with computer technology to provide real-time or delayed access to product data. Viewers identify a product or object displayed in a video, television show or movie and by merely pointing and clicking on the object to obtain marketing and other data.

13 Claims, 5 Drawing Sheets

FIG. 9C

METHOD, APPARATUS AND SYSTEM FOR PROVIDING ACCESS TO PRODUCT DATA

This application is a divisional of application Ser. No. 09/961,392 filed Sep. 25, 2001 now abandoned.

A. FIELD OF THE INVENTION

The present invention provides a method, system and apparatus for accessing product data that is displayed or otherwise shown on visual displays, including, but not limited to, televisions, movies, personal computers, personal digital assistants (PDA) and the like.

B. BACKGROUND OF THE INVENTION

Traditional forms of marketing and advertisement have primarily relied on commercials. Thirty or sixty-second spots are strategically placed throughout programs. Through the use of demographics and other well know marketing methods advertisements are shown during programs in hopes of attracting purchasers. New technology, including new VCR recording devices, make it increasingly easy for viewers to discard the commercials. As viewers become accustomed to movies on demand or advertising free content, which is made at least in part possible by the Internet, the reliance on traditional commercial advertising is no longer ideal.

Movies, which lack the ability to stop and play a commercial, have bypassed the use of commercials through the use of product placements. Products are strategically placed in a movie, often for a predetermined price, such that the viewers will notice the product and want to purchase it. Well-known examples of product placements include BMW's placement of automobiles and motorcycles in several of the James Bond films. The problem that occurs is that absent blatant product placements that make the viewer aware of the product, its maker and where it may be purchased, product placement adverting is limited. Although it may be applied to traditional television programs, its applicability is limited. Products that do not have immediate visual cues as to maker, name and model are not well suited for product placement use.

Industry has tried to marry the Internet with traditional forms of advertising by placing banner ads in shows. As predetermined by the show's producer, web links may appear in which the user is directed to go to the link if background information is desired. Banner ads have been primarily used for background information and have not been used as advertisements. Banner ads do not provide effective advertisements, as they require visual interruptions.

The present invention solves this and other problems by providing a unique method of creating a dynamic product placement database that can be accessed in real-time or on a delayed basis, and provides the viewer with key marketing information about a specific product. In doing so, the need for commercials that interrupt a program is reduced and increased revenue can be recognized by groups producing and displaying programs.

VISUAL IMAGE MARKETING (VIM) is a system whereby the visual image on a film or television program is utilized to market that specific product. In VIM, film\television is combined with computer technology to provide real-time or delayed access to product data. Viewers identify a product or object displayed in a video, television show or movie and by merely pointing and clicking on the object to obtain marketing and other data.

One embodiment the present invention is integrated into a set-top box that provides access to programs that are specially designed to work with VIM as well as access to programs which were subsequently catalogued so as to work with VIM. A user is permitted to watch a movie and with the use of a selection device, which may include a mouse, highlight a product. The user is then provided with selected marketing data associated with that product. For example, if the user is watching a sitcom and likes the shirt that the main character is wearing, the user can click on the shirt as it appears in real-time and obtain instantaneous marketing data.

In another embodiment, a database is created that can be accessed on a delay basis. The database contains search items, such as show name, character name, approximate time into program, article description, etc., which may be used to facilitate retrieval of market data.

It is expressly contemplated that the present invention may be operated either in conjunction with the displaying of video, such as a television, or that it may be separately provided. In addition, it is expressly contemplated that the Internet, satellite networks or other networking technology may be used to facilitate access to the product database.

By providing access to marketing information on virtually all of the items displayed in a video, television show, movie or the like, the need for commercials is reduced, viewers have access to increased marketing information and additional revenues sources may be realized.

C. BRIEF DESCRIPTION OF THE FIGURES

The present invention is described with reference to the following figures.

D. DETAILED DESCRIPTION OF THE CLAIMED INVENTION AND OF THE PREFERRED EMBODIMENT

The present invention may be implemented using a variety of hardware. The present invention is preferably designed so that it is usable with a variety of different hardware configurations. Homes containing a traditional television and computer may utilize the VIM database, whereas homes that have an integrated television-VIM apparatus may access real-time marketing data as well as delayed data.

1. Hardware

Figure 1:
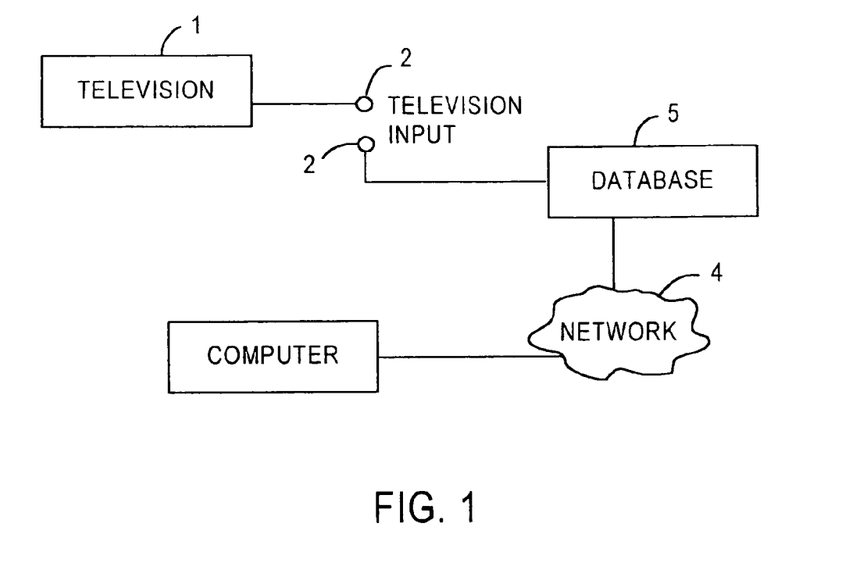
FIG. 1 is a schematic diagram of a television and computer implementation.

As shown in FIG. 1, a television 1 is provided in a household that is designed to receive traditional television images through an input 2. A computer 3, which may comprise a personal computer a PDA or other digital assistant, is provided that has access to a database 5 through use of network 4. The network 4 may comprise the Internet, a phone line with dial in access, wireless network or other suitable means. The database has an input 2 for television data, which may be in the form of VIM processes visual data or unprocessed data, i.e. a traditional television input.

Figure 2:
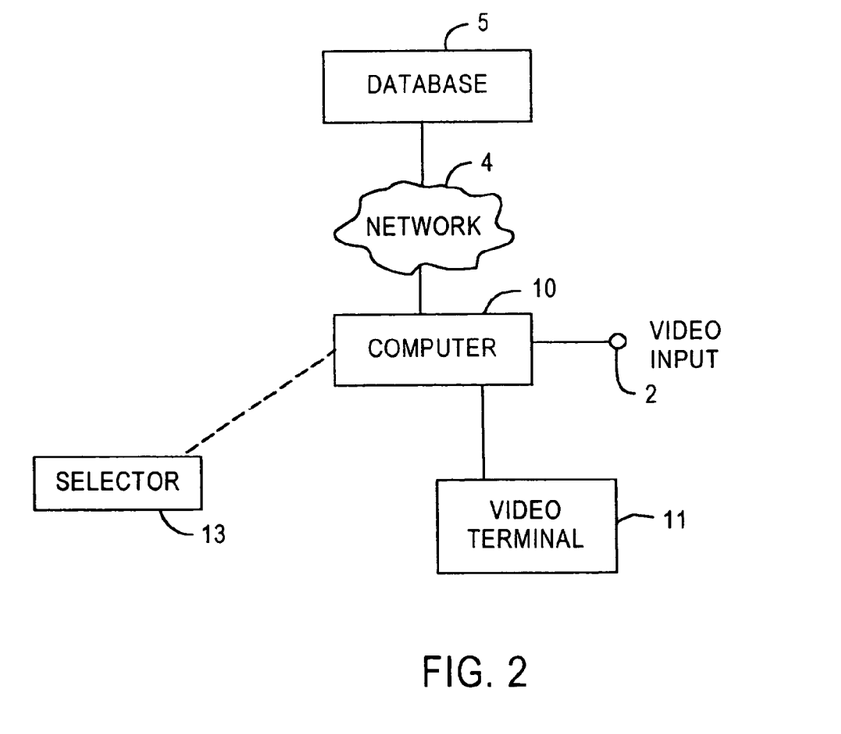
FIG. 2 is a schematic diagram of a set-top box implementation.

An alternate hardware configuration is shown in FIG. 2. A computing device 10, which those of ordinary skill in the art will understand to include a processor and storage device, is connected to a video terminal 11. The computing device 10 may comprise a traditional PC with a video input and tuner capabilities such that the personal computer can display television images. Preferably, the computing means is a dedicated computing device comprising a processor and memory that can be connected to a tradition television. The computing means is provided with a selector device 13, which may include a mouse, a remote control device having selector capabilities or the like. The computing device 10 may be connected to the database 5 through the use of the Internet, telephone lines, satellite network, wireless network and other well known means. The computing device also receives a television input 2, which may be provide separately from the database access.

2. Method of Selecting Objects

The present invention combines the ability to visually select items that are displayed. In a preferred embodiment the video is digitally recorded such that pixel data can be recorded that corresponds to each item for which marketing data will be available. Information on the objects in a video may be recorded on the side of the film traditionally used for sound data. Alternatively, the object information may recorded on an interleaved into or between one of the 30 frames per second which make up a video such that the computing means may retrieve the data while the viewer does not notice the data transmission.

In another invention, the video is scanned by an object extraction device and the object data is provided either in toto or in an as needed basis to the computing means. The object extraction device may on its most simple level include an overlay screen under which video plays. The overlay screen is divided into X and Y coordinates and used to mark the position of objects in the video. Object location and time data is recorded and made available to the computing means.

Figure 3:
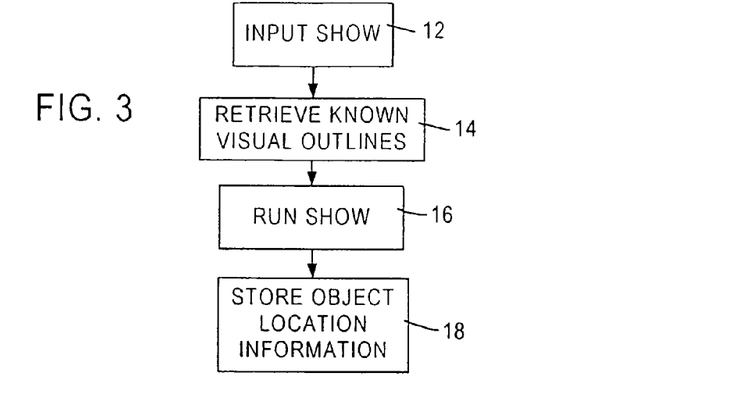
FIG. 3 is a description of one method for processing video data.

As shown in FIG. 3, objects may be extracted from an existing television show using known shapes of objects. A television program in input 12 and known visual outlines are retrieved 14. The visual outlines may be stored based on individual shows or other grouping methods. For example, all products in a given show may be provided by a given company. Thus, all outlines for soda cans, will be determined to correspond to the soda of the given company. Consistent branding over an entire show, permits the visual recognition of products to be simplified and also assists in increasing the advertising worth of the product placement. It is expressly contemplated that where sufficient variations exist in product shape and color that individual brands can be identified.

As the show is run 16, the images on the show are compared to the known outlines. Known methods of digital signal processing, such as through the use of wavelet filtering, may be used to assist in outline recognition. It is expressly contemplated that the show may be run through the process several times using a variety of known filtering techniques to assist in identifying products and their placement 18.

Figure 4:
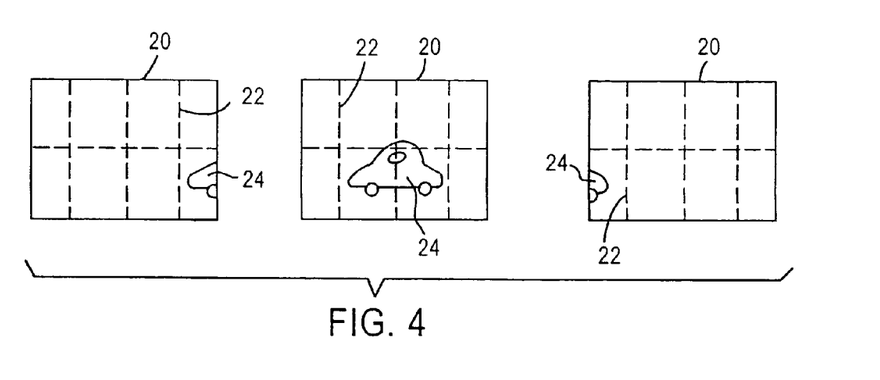
FIG. 4 is a schematic of one embodiment for location of objects on a video screen which uses an invisible overlay.

The present system is also designed, however, to work with existing video. In one such embodiment, a video grid overlay is used, as shown in FIGS. 4a-c. A grid 22 is established over the display 20 so as to record the placement as a function of time, of objects 24. The grid data is stored in database 5, in combination with product information and search data.

Figure 5:
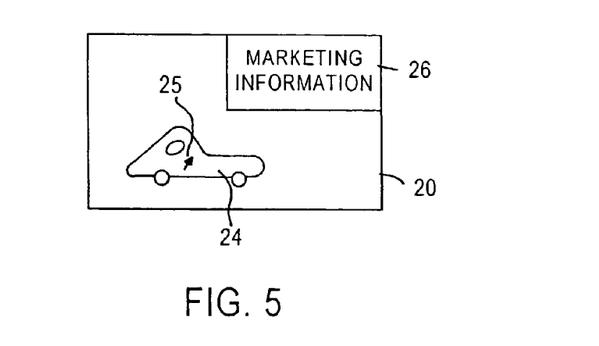
FIG. 5 is a schematic of a video screen that has marketing data retrieved.

As shown in FIG. 5, when a user selects a item though the use of a selection device 25, the system searches the grid coordinates being selected as a function of program time, and displays appropriate marketing information 26.

Upon selection of an object, the computing means retrieves predetermined marketing data. The type of marketing data may vary with the show, time, expected demographics, and the like.

3. VIM Demo

By way of example only, a VIM demo, also known as the diamond head project, has been created using a prerecorded video on a dedicated PC platform. The present invention is not limited to the VIM demo configuration and features. Rather, one possible embodiment has been implemented in the VIM demo to assist in describing the VIM apparatus and method. The demo was created to run on a stand-alone PC, although it is expressly contemplated that the VIM computing means may be incorporated into a set-top box or into a television.

In the demo the ASF file format was used. ASF is a file format that stores audio and video information and is specially designed to run over networks like the Internet. It is a highly flexible and compressed format that contains streaming audio, video, slide shows, and synchronized events.

The compelling feature of Advanced Streaming Format (ASF) streams is that they can deliver script commands to the Microsoft® Windows MediaT Player control, along with the audio and video streams. These script commands are pairs of UnicodeT strings synchronized with a particular time in the multimedia stream. The first string identifies the type of command being sent, and the second specifies the command to process. When the stream reaches the time associated with a command, the control sends a ScriptCommand event to the web page which contains it. An event-handling routine can then respond to this event. The script command strings are passed to the event handler as parameters of the ScriptCommand event.

These synchronized events are used in this project. The position (rectangular co-ordinates) of the car are stored in the ASF file and the definition of the car and the URL are also stored in the ASF file. In this project two global variables are used for the car position and for the car description which are always updated by the event-handler routine. When a user, viewing the ASF file via a web browser or other media player, clicks in the car position it will show the prestored message or goto the URL which are stored in the global variables.

The two files used by this project include:

i) index.htm (main
   program file)
ii) diamond.asf(an
   Advanced Streaming Format file which contain scripts)

The Diamond.asf file is created by converting an AVI file. Microsoft Windows Media Encoder has been used to this conversion. Microsoft Windows Media Encoder is a component of "Windows Media Tools" which can be downloaded form the following site:

http://www.microsoft.com/windows/windowsmedia/en/download/default.asp

Windows Media Tools also has a component "Windows Media ASF Indexer" which is used to edit and create script commands in the Diamond.asf. Additional information concerning script commands can be found at the MSDN Library-January 2000->Platform SDK->Graphics and Multimedia Services->Windows Media Player Control->Using the Windows Media Player Control->Processing Embedded Script Command.

There are two types of user defined script commands that are used in Diamond.asf. One is "DHO" and other one is "DHC". "DHO" is used for the definition of the object or the URL of the object. Here, at the beginning of the parameter of "DHO" type script command, "URL" is used to define that it is a URL and the value of the URL is follows by it with a separator "|".

In "DHC" type script command, values of the co-ordinates of the current object are kept in the parameter. In this exemplary embodiment, the coordinate values that are kept are the upper-left corner of the object and lower right corner of the object in sequence.

In Index.html, a "Windows Media Player" ActiveX control is used to view the diamond.asf file. The code is as follows:

```
<HTML>
<HEAD><TITLE>Diamond Head</TITLE></HEAD>
<BODY>
<OBJECT ID="MediaPlayer1" WIDTH-320 HEIGHT=240
    CLASSID="CLSID:22D6f312-B0F6-11D0-94AB-0080C74C7E95"
    TYPE="application/x-oleobject">
<PARAM NAME="FileName" VALUE="diamond.asf">
<PARAM NAME="ShowControls" VALUE="False">
<PARAM NAME="AutoRewind" VALUE="True">
<PARAM NAME="AutoStart" VALUE="False">
<PARAM NAME="SendMouseClickEvents" VALUE="True">
<PARAM NAME="AllowChangeDisplaySize" VALUE="False">
<PARAM NAME="ClickToPlay" VALUE="False">
</OBJECT>
<BR><BR>
<INPUT TYPE="BUTTON" NAME="BtnPlay" VALUE="Play">
<INPUT TYPE="BUTTON" NAME="BtnStop" VALUE="Stop">
<SCRIPT>
<!--
function displayWindow(url, width, height) {
var Win=window.open(url, "displayWindow", 'width='+width+
',height='+height+',resizable=1,scrollbars=yes');
}
//-->
</SCRIPT>
<SCRIPT LANGUAGE="VBScript">
<!--
DIM sObj, sCor
DIM X1, Y1, X2, Y2
DIM tag, msg
Sub BtnPlay_OnClick
MediaPlayer1.Play
End Sub
Sub BtnStop_OnClick
MediaPlayer1.Stop
MediaPlayer1.CurrentPosition=0
End Sub
Sub MediaPlayer1_Click(iButton, iShiftState, fX, fY)
if fx>X1 and fx<X2 and fy>Y1 and fy<y2 then
    tag=Split(sObj,"|")(0)
    msg=Split(sObj,"|")(1)
    if tag="MSG" then
        MsgBox msg,64
    end if
    if tag="URL" then
        displayWindow msg, 640, 480
    end if
end if
End Sub
Sub FindXY(sStr)
X1=cint(Split(sStr," ")(0))
Y1=cint(Split(sStr," ")(1))
X2=cint(Split(sStr," ")(2))
Y2=cint(Split(sStr," ")(3))
End Sub
Sub MediaPlayer1_ScriptCommand(sType, sParam)
if sType="DHO" then
    sObj=sParam
end if
if sType="DHC" then
    findXY(sParam)
end if
End Sub
-->
</SCRIPT>
</BODY>
</HTML>
```

In the above code, the MediaPlayer1_ScriptCommand (sType, sParam) is the method which hooks the script_command event of media player. When a script command is found from the diamond.asf this method executes and if it is "DHO" type then the value of the parameter is saved in a string type variable. If the command is "DHC" type then it is saved in the four variables X1,Y1, X2,Y2 which are the coordinates of the rectangle in which the object resides.

If the user clicks on the view panel of the media player, then the MediaPlayer1_Click method is executed and if the mouse point is on the rectangle of the object (i.e., the car), then the corresponding action is triggered.

4. Product Database

Figure 6:
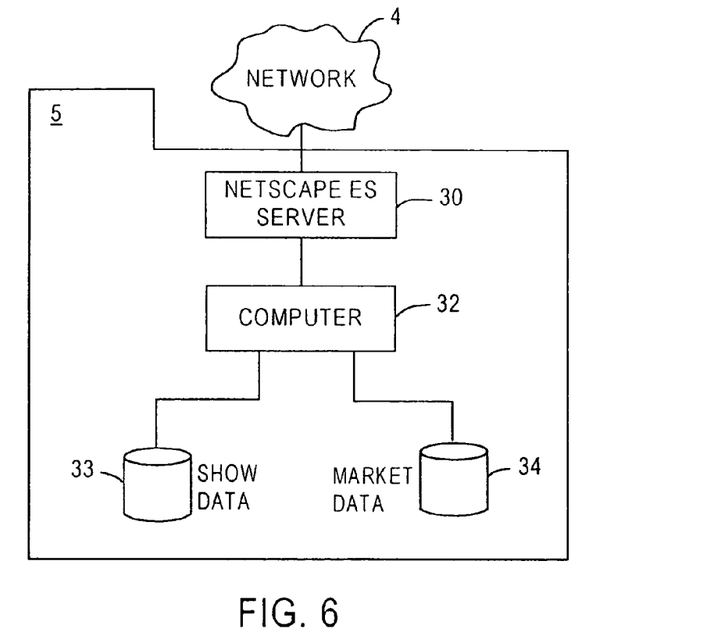
FIG. 6 is a schematic of a marketing database.

An illustrative version of the marketing database 5 is shown in FIG. 6. Information that may be captured in the database, but which is not necessarily required include:

Locating information, including, but not limited to: Show name; Airing date; Channel; Length; Start time; End Time; Commercial breaks; Story line information; Character information; or Products coordinates (X,Y).

Product Information, including but not limited to: Name; Distributor; Price; Link to store; Link to vendor web site; or versions based on demographics.

The database is designed to be accessible through the Internet or other known networks by all individuals, including individuals that do not have access computing means or other real-time access methods. As shown in FIG. 6, the database 5 is connected to the network 4, which may include the Internet, through the use of a Netscape ES server 30, for example. A computer 32 is provided that has access to show data 33 and to marketing data 34. Although the data is shown as being stored in separate databases, it may be combined or separated as those of ordinary skill in the art will recognize.

This increased accessibility permits requires that users who are manually searching for the product information have sufficient show based location data that permits them to reasonably locate the item desired.

For example, if a viewers sees a lamp in the living room scene of a sit-corn and wants to get more information. The viewer can access the database that is connected to the Internet. The viewer may identify the show name, the date of viewing, the channel the program was seen on and enter the word lamp. If there are too many lamps, the user may also specify that the lamp was during the first half of the show or after the first commercial break. The user may indicate that the lamp or product was seen within the first 5-10 minutes of the show.

It is expressly contemplated that once the user retrieves an item, as shown in FIG. 5, the user is provided with the option to see similar products displayed during the show, or in different episodes, or similar products offered by the same vendor. As the user views different objects, marketing data may be collected that can be used to assist in future product placement.

5. Acquiring the Image and Object Location Data

The present invention contemplates a variety of functionally equivalent ways to identify the market-related items and their respective locations in a sequence of video or movie frames. These different techniques for identifying the products' locations can be used individually or in combination with one another. While an individual can manually review images and identify products within these images, the present invention also relies on automated methods so that someone is not required to identify the region of each image that corresponds to each product.

Conventional image capturing electronics and cameras include technology with digital signal processing already built into the camera (e.g., CCD image sensors). Alternatively, the image processing capability can be provided by equipment parallel to the image capturing functionality of the camera so that both occur relatively simultaneously. Similarly, any image processing could also occur subsequent to the image capture. Using this last alternative, previously acquired film and video can be processed to identify product related regions even if not originally captured by appropriately configured cameras and equipment.

One particular image-region identification technique contemplated by the present invention uses an infrared camera located at a predetermined location to capture the same scene as a more traditional camera. Because the infrared camera is at a know location relative to the conventional camera, the infrared-image can be easily coordinate-transformed onto the visible image to identify those regions of the image occupied by the various actors or other individuals. Another alternative technique, would be to use a camera having sensitivity in both the visible and infrared range; in this alternative, no coordinate transforms are necessary to locate image regions occupied by people that might be wearing or otherwise using products of interest.

Another technique for roughly identifying the location of items in an image is through the use of attached transponders for which a receiver (incorporated in the camera or operating in conjunction with the camera) can detect their location. This technique is similar in practice to that used by video game designers to provide realistic animation. Athletes, or other participants, are outfitted with transponders on various body locations and then filmed while performing different physical activities. These films are then converted into animation that closely mimics the athlete's motion.

Another alternative for locating a product in an image is to use laser pointers similar to the technology of laser-guided ordnance. During filming of a scene, a laser is targeted on a product, or products, and an appropriate receiver tracks that laser target during the scene so as to correspond with the product's location during the scene. Alternatively, later processing equipment could scan a previously captured film for the laser target information to identify objects of interest.

Regardless of the technique or technology used to capture a video image composed of various items which will eventually have marketing information associated therewith, virtually any conventional image processing and recognition method can be used to automate the identification of the separate items within the sequence of images.

Using conventional contour representation, the contour of a region or of an object within an image can be described as one of several compact representations that facilitate manipulation of the object. Examples of conventional contour representations can include chain codes, crack codes and run codes. These object outlines can be used individually or with shape recognition software to easily identify which pixels within an image correspond to different objects within the image.

One of ordinary skill will recognize an be able to apply considerations such as smoothing (or filtering) operations, pixel size and formation, camera sampling rates, and aspect ratio all play a role in accurately identifying those regions of an image that correspond to a particular object.

Other alternatives for segmenting an image into regions of interest can rely on such techniques as color (or chromaticity) regions. Using this segmenting method a viewer can be permitted to query for a "yellow sweater" or a "red car" and appropriate regions of the image will be detected and the VIM information associated therewith will be made available to the viewer.

Figure 7:
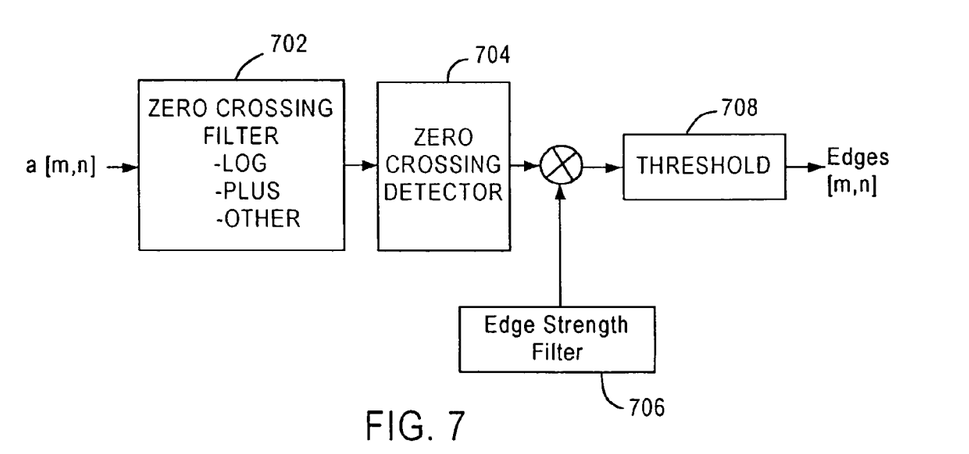
FIG. 7 is a block diagram of one type of edge detection system.

Other image processing methods can include segmentation thresholding or edge finding. FIG. 7 illustrates a general system, as is known in the art, for determining the various edges of items within an image. An image a[m,n] has applied thereto a well known type of zero-crossing filter 702 and a zero-crossing detector 704. The results are multiplied by an edge strength filter 706 and subjected to thresholding 708 in order to identify one or more edges[m,n].

Regardless of the techniques or methods used, the end result is a number of regions are identified in each image that correspond to a particular product which has associated marketing information. This marketing information can be made available to a viewer who, when viewing the sequence of images, selects a particular region of the viewing screen. When a region is selected the associated object is identified whose location coincides with the selected region and then this object identification information is used to search and retrieve appropriate marketing information from a database of information.

6. Distributing VIM Data

There are a variety of methods in which the video images, the object location information and the marketing information database can be distributed to viewers. In particular, HDTV is one current distribution technique, utilizing terrestrial as well as satellite transmitters, that has available bandwidth for auxiliary information in addition to the digitally encoded image data. This auxiliary information such as item identifiers and item pixel ranges in each image frame can, thus, be distributed to a viewer's equipment (e.g., television, computer, or video terminal) having an appropriate decoder for separating the auxiliary information from the image data.

Figure 8A:
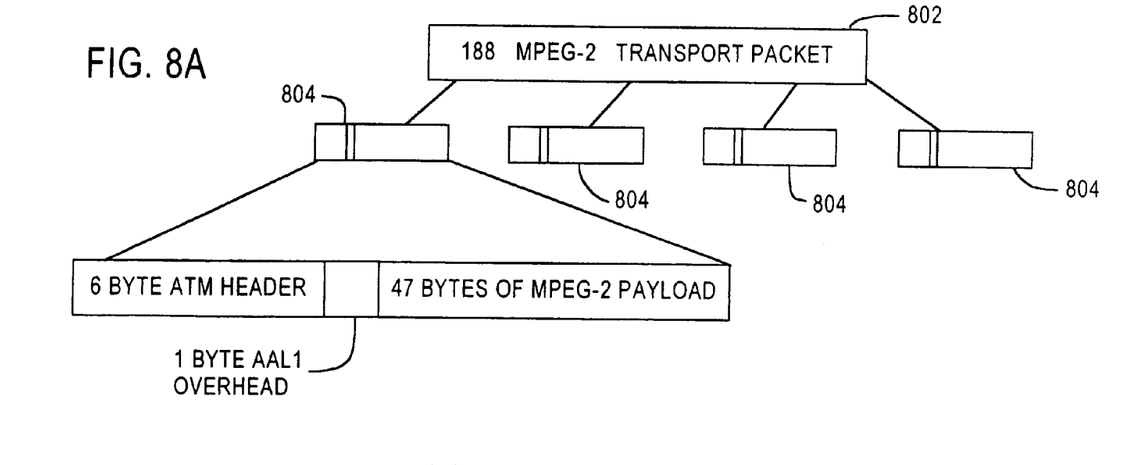
FIGS. 8A and 8B are exemplary ATM AAL arrangements for transporting video data.
Figure 8B:
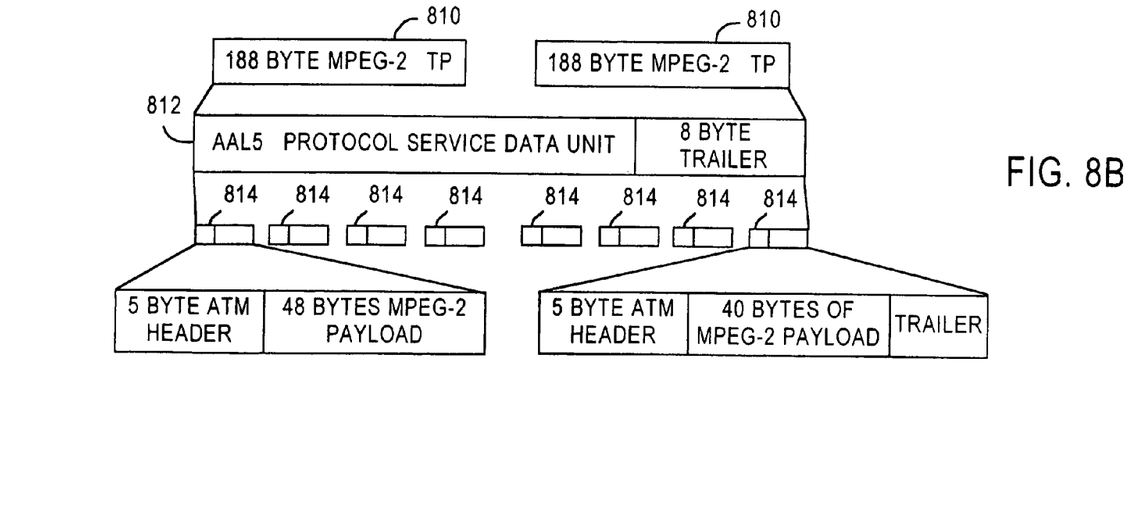

Alternatively, if the video data is transmitted via MPEG-2, for example, over ATM, the additional information about the various items and their pixel locations can be included through the use of the adaptation layer of the cell-based transport. As known to those of ordinary skill, in order to carry data units other than the 48-octet payload size in ATM cells, an adaptation layer is needed. The ATM Adaptation layer (AAL) provides for segmentation and reassembly of higher-layer data units and detection of errors in transmission. For digital television transmission, the MPEG-2 transport standard is the conventional format being considered and both AAL1 and AAL5 have been used as a design for packaging digital video. FIG. 8A illustrates AAL1 in which each MPEG-2 transport stream packet 802 is mapped into 4 ATM cells 804. FIG. 8B depicts an AAL5-based approach in which n MPEG-2 single program transport stream packets 810 are mapped into an AAL5 service data unit (SDU) 812 unless there are fewer than n transport stream packets left in the sequence; with n=2 being typical. In the case in which there are fewer than n packets left, the last AAL5 SDU contains all the remaining packets. When n=2, the SDU size is 376 bytes which, along with an 8 byte trailer fit evenly into payloads of 8 ATM cells 814 as shown in FIG. 8B. The auxiliary information can be transmitted over the ATM transport as part of the MPEG-2 data or as an independent cell stream separate from the MPEG-2 sequence. In this latter instance, synchronizing information can be used in the separate ATM cell stream to associate auxiliary information with the appropriate images of the MPEG-2 sequence.

Another possible alternative contemplated by the present invention includes image sequences that are captured on film. Film conventionally includes the image data made up of individual frames sequentially arranged along with audio tracks and other identifying data encoded on the sides of the frames so as not to be interrupted by the film's sprocket holes. The auxiliary VIM information about products and their locations within a frame can be encoded in one of the many audio channels or other "track" areas on the sides of the film. An appropriate projector is then used, upon displaying the film, to detect and decode the auxiliary VIM information during the showing or playback of the film. Presented below is one exemplary embodiment which uses a particular formatting and encoding sequence developed by Sony known as SDDS. However, one of ordinary skill would easily recognize that the present invention contemplates, and can be modified to include, variations that can involve track placement on the film, encoding/decoding algorithms, the number of encoded tracks, decoding hardware, etc.

Figure 9A:
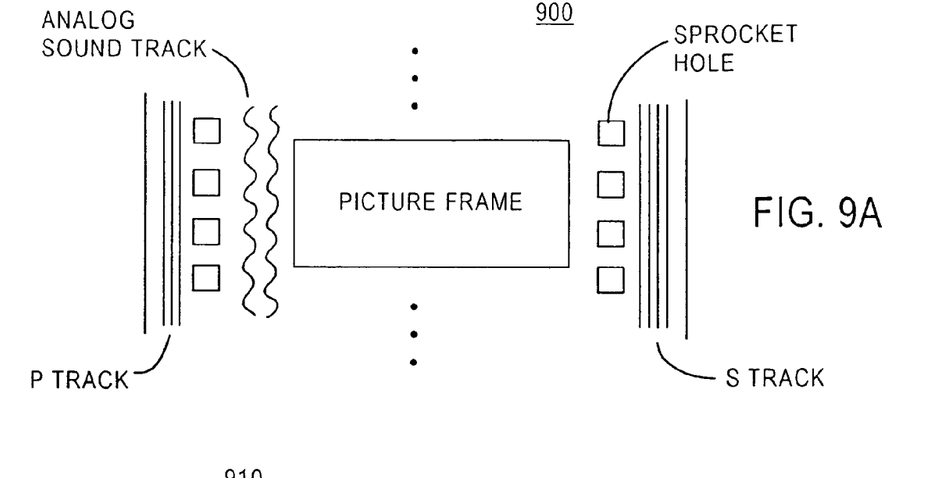
FIGS. 9A-9C is an exemplary embodiment of a playback system based on Sony's SDDS system.
Figure 9B:
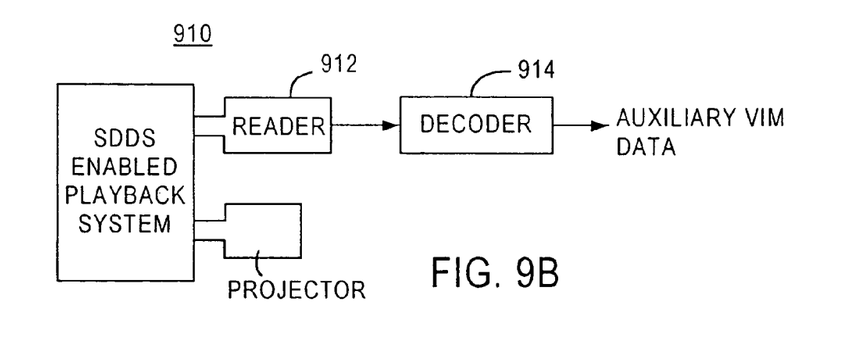

The SDDS system developed by Sony can be modified to incorporate, or substitute, the features of the present invention. In particular in the SDDS system, as shown in FIG. 9A, a P-track and S-Track are added to the film 900 to encode digital sound information. In particular, data bits are recorded on the film with black and white data patterns. In certain embodiments of SDDS, the information in the S-track and P-tracks are redundant. The present invention contemplates various embodiments that can utilizing both the S and P tracks to carry auxiliary product information or merely one of the tracks to carry auxiliary information. Thus, an SDDS enabled film projector system 910, as shown in FIG. 9B, includes the necessary reading and decoding hardware and features to extract auxiliary information from a film source.

Figure 9C:
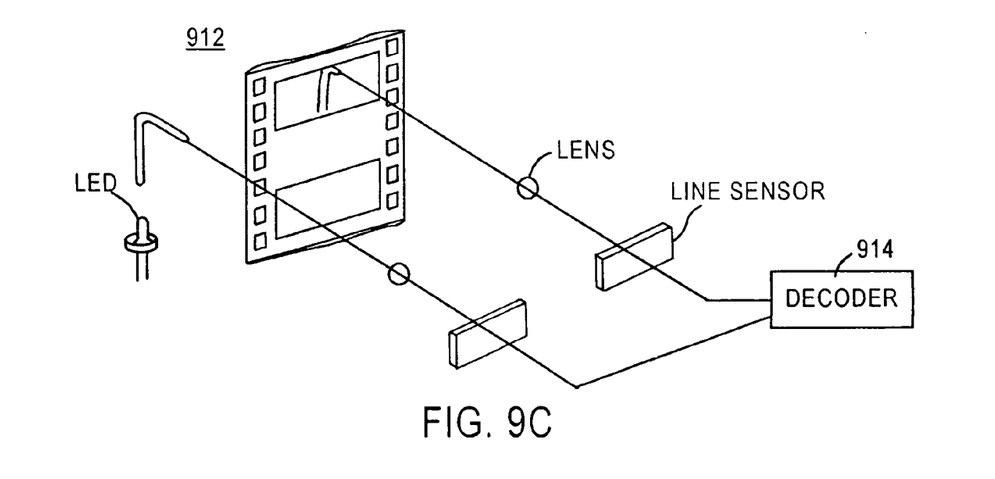

FIG. 9C illustrates one embodiment of an optical reader 912 that reads auxiliary information from both the S-track and P-track which is then decoded by an VIM decoder 914. This exemplary reader depicts LEDs used to illuminate the P and S tracks on the film. The results of this illumination are focused by a respective lens onto an optical sensing device, such as a CCD, that detects the encoded data from a single line of the tracks. The output from these line sensors are then forwarded to a decoder for further processing.

As mentioned above, but not illustrated, two decoders may be used, one providing conventional SDDS audio information and the other providing the VIM information. Similar to an SDDS audio decoder, the VIM decoder 914 will receive data from the reader 912, optionally perform some type of error checking or error correcting, and then extract the VIM information for a number of different purposes that may include inputting to a viewer's computer system, transmitting along with the image frames, or some other similar use. If the original VIM information encoded on the film is first compressed, then the VIM decoder 914 can also include decompression hardware and software to retrieve the compressed information before outputting the VIM information.

The present invention is not limited to the above describes examples and may be modified as would be appreciated by one of ordinary skill in the art.

I claim:

1. A method for providing marketing information, comprising the steps of:
   storing marketing information about a product;
   simultaneously recording in the same storage medium a digital video sequence as it is being created and information identifying which pixels correspond to the product in the digital video sequence;
   transmitting the digital video sequence to a viewer;
   displaying the digital video sequence on a display;
   receiving an inquiry about the product from the viewer, the inquiry being generated by the viewer selecting, via a selection device, at least one pixel of the single digital video sequence displayed on the display device corresponding to the product;
   retrieving the stored marketing information about the product based on the at least one pixel selected by the inquiry; and
   providing the retrieved, marketing information to the viewer.

2. The method according to claim 1, further comprising the step of:
   transmitting the associated location information to the viewer substantially simultaneously with the digital video sequence.

3. The method according to claim 1, wherein the step of transmitting the digital video sequence to the viewer comprises transmitting the digital video sequence via one selected from the group consisting of television broadcast, HDTV broadcast, ATM transport, a computer network.

4. The method according to claim 1, wherein the step of providing the retrieved marketing information to the viewer comprises providing the retrieved marketing information via one selected from the group consisting of television broadcast, HDTV broadcast, ATM transport, a computer network.

5. The method according to claim 1, wherein the steps of receiving an inquiry and providing retrieved information are performed while the digital video sequence is being transmitted.

6. The method according to claim 3, wherein the step of providing the retrieved marketing information to the viewer comprises providing the retrieved marketing information via one selected from the group consisting of television broadcast, HDTV broadcast, ATM transport, a computer network.

7. The method according to claim 1, wherein the step of transmitting the digital video sequence to the viewer comprises transmitting the digital video sequence via a television broadcast.

8. The method according to claim 1, wherein the step of transmitting the digital video sequence to the viewer comprises transmitting the digital video sequence via an HDTV broadcast.

9. The method according to claim 1, wherein the step of transmitting the digital video sequence to the viewer comprises transmitting the digital video sequence via an ATM transport.

10. The method according to claim 1, wherein the step of transmitting the digital video sequence to the viewer comprises transmitting the digital video sequence via a computer network.

11. The method according to claim 1, wherein the step of simultaneously recording in the same storage medium a digital video sequence as it is being created and information identifying which pixels correspond to the product in the digital video sequence comprises simultaneously digitally recording the digital video sequence and pixel data that corresponds to each item in the digital video sequence for which marketing information will be available.

12. The method according to claim 1, wherein the storage medium is a digital medium.

13. The method according to claim 1, wherein the digital video sequence and information identifying which pixels correspond to the product in the digital video sequence are simultaneously recorded in a single database.

* * * * *